United States Statutory Invention Registration [19]

[11] Reg. Number: H182

Heller [43] Published: Jan. 6, 1987

[54] ADJUSTABLE INDICATING DEVICE FOR LOAD POSITION

[76] Inventor: Clarence Heller, 2205 Manassas Dr. SW., Huntsville, Ala. 35803

[21] Appl. No.: 684,194

[22] Filed: Dec. 20, 1984

[51] Int. Cl.[4] ..... G08B 13/14; H01H 3/00

[52] U.S. Cl. ..... 340/568; 200/153 LA

[58] Field of Search ..... 340/568; 200/153 LA, 200/153 T, 47

[56] References Cited

U.S. PATENT DOCUMENTS

| | | | |
|---|---|---|---|
| 2,910,564 | 10/1959 | McBroom | 200/153 LA |
| 3,189,700 | 6/1965 | Eidson | 200/153 LA |
| 3,937,912 | 1/1976 | Martin | 200/153 LA |
| 4,107,490 | 8/1978 | Keane | 200/153 LA X |
| 4,349,711 | 9/1982 | Lake | 200/153 LA |

*Primary Examiner*—Stephen C. Buczinski
*Assistant Examiner*—Linda J. Wallace

[57] ABSTRACT

FIG. 1 shows the adjustable indicating device (11) that is adapted to be mounted to the plate (13) defining a load compartment. The device has a central housing (23) with two wing structures (25, 27) on each side which support conventional switch means (29, 31) having cantilevered arms (61). Extending through the housing (23) is a movable shaft (43) that is spring biased to a forward extended position and adapted to respond against a load being positioned. The read end of the movable shaft (43) has an adjustable cam means (55) which acts upon the cantilevered arms (61) to cause a switching action upon shifting of the movable shaft (42) by a load.

5 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ADJUSTABLE INDICATING DEVICE FOR LOAD POSITION

ORIGIN OF THE INVENTION

The invention described herein was made by an employee of the United States Government and may be manufactured and used by or for the Government for governmental purposes without payment of any royalties thereon or therefor.

TECHNICAL FIELD

This invention relates to a device for electrically indicating the position of a load being placed in position, and more particularly to a device that may be adjusted over a limited range for setting its operation relative to a load object being placed in position.

BACKGROUND ART

While in earth orbit, the space shuttle orbiter occasionally has a need to retrieve satellites and other space objects which are placed within its payload bay for return to earth. In accomplishing the necessary positioning of the retrieved object within the payload bay there was no device herebefore that would indicate to the astronauts within the crew compartment when the retrieved object was within its correct position in the payload bay.

While the prior art is replete with mechanical devices that activate an electrical switch according to some preset movement, none were adapted to have an adjustable feature which would enable adjustments to be made in the amount of movement necessary to activate the switch. Also, such prior devices lacked the redundancy in the feature most likely to fail which is the mechanical aspects of the switch.

Accordingly, it is an object of the present invention to provide a device which is reliable and simple in construction and provides an adjustable means relative to the activation of a switch.

Another object is to provide a device which is adapted to be activated by a pushing load and which has redundant electrical switches to provide an electrical signal indicative of the final position of that load.

Further objects will become apparent as the description of the invention proceeds.

STATEMENT OF THE INVENTION

The invention is an indicating device which has a movable shaft that responds to the load being positioned. The movable shaft has an adjustable cam surface which acts upon a switching mechanism which electrically connects to a signal indicator. The device has wing structures extending outwardly from the housing of the movable shaft to support each switching mechanism so each may react to the same cam surface in a non-interfering manner.

DETAILED DESCRIPTION OF THE INVENTION

Figure 1:
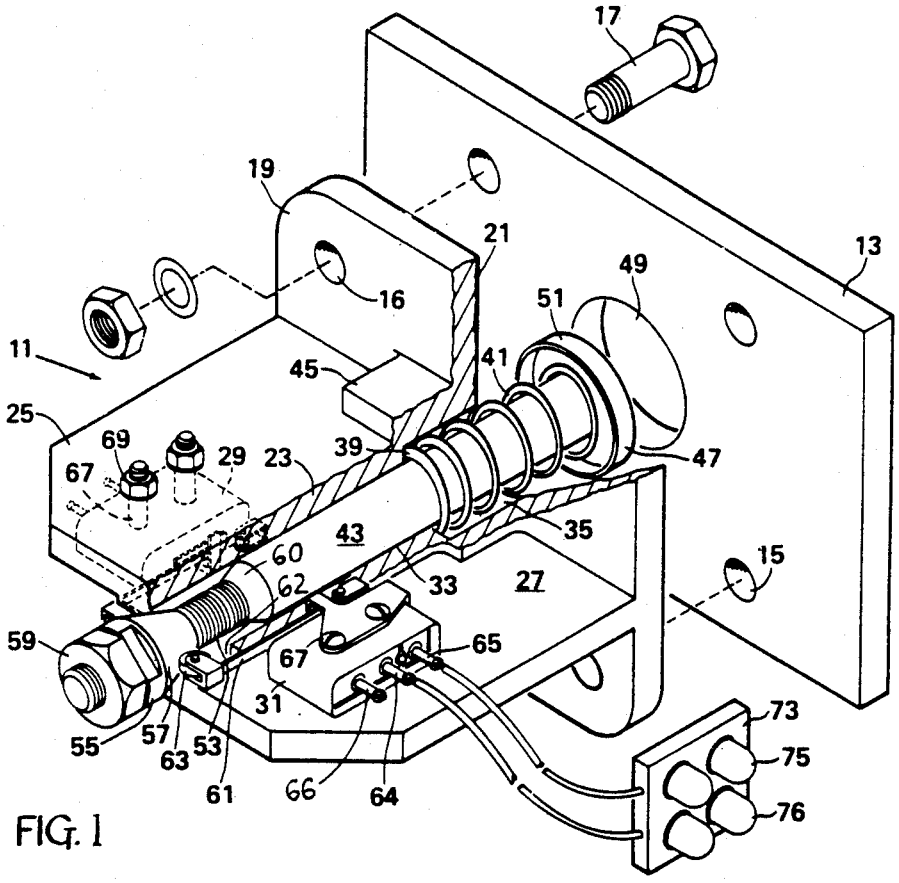
FIG. 1 is a view of the device according to the present invention with portions broken away to show the movable shaft within the housing.

Referring to the drawings, wherein FIG. 1 illustrates a device 11 for indicating the position of a load. The device 11 is adapted to be mounted to the back surface of a plate 13 within the payload bay of the space shuttle orbiter (not shown). For purposes of illustration the device 11 shown in FIG. 1 is set back away from the plate 13 that defines the area which receives the load, but the holes 15, 16 in the plate 13 and device 11 are shown aligned for the bolts 17 to be used in fixing the device 11 to the plate 13.

Figure 2:
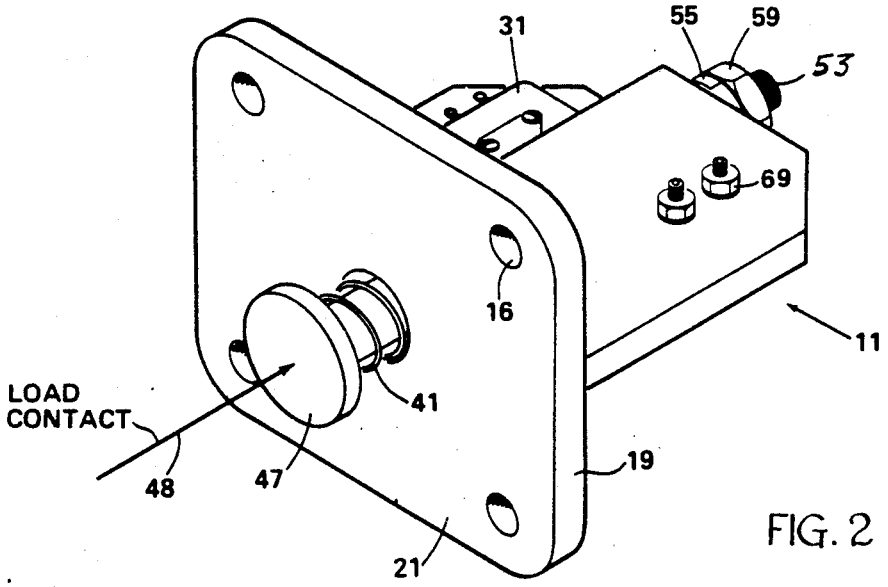
FIG. 2 is a frontal view of the device of FIG. 1, showing a load application to the device.

The indicating device 11 has an integral frontal member 19 as shown in both FIG. 1 and FIG. 2, that is rectangular in configuration and presents a forward flat surface 21 that is adapted to be flush with the back surface of the plate 13 for the load reception compartment when bolted together. Extending perpendicularly from the back of the frontal member is a central housing 23 which has two vertically offsetting horizontal wing members 25 and 27 that form a mounting surface for switches 29, 31.

The central housing 23 has a bore or hole 33 extending through its longitudinal length and also extending through the frontal plate 13. The forward portion 35 of the bore 33 has a greater diameter than its other portion to form a stop edge 39 and to accommodate a coil spring 41. A movable shaft 43 extends through the bore 33 and coil spring 41 and extends outwardly from both the frontal plate 19 and end of the central housing 23. The central housing 23 has a small rectangular thicker portion 45 about the larger bore portion 35 to provide the needed strength of the structure at that location.

The forward end of the movable shaft 43 has a circular cap 47 fastened thereto which forms the contact means for a load being placed in position. The shaft 43 upon contact with the load will be forced rearwardly until the cap 47 is flushed with the plate 13 forming the load reception compartment. The plate 13 has a circular opening 49 to permit the cap to pass through to its normal extended position. The cap 47 has a greater diameter than the shaft 43 and the circular side wall 51 forming a rear recess for confining the forward end of the coil spring 41. The coil spring 41 acts between the step edge 39 of the bore 33 and the cap 47 to urge the shaft 43 to its most forward position.

Figure 3:
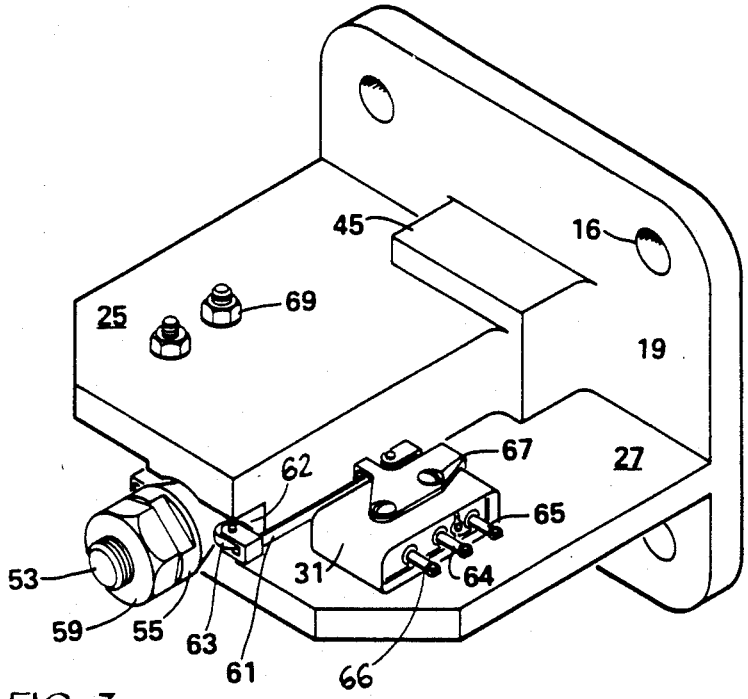
FIG. 3 is a rear view of the device of FIG. 1.

The rear portion of the movable shaft has a reduced diameter 53 that is threaded for a nut 55 to be screwed thereon. As shown in FIG. 1 and FIG. 3 the movable shaft 43 extends slightly from the central housing 39 when positioned within the bore 33 at its most forward location because the nut 55 thereon acts as a stop against the housing to prevent the coil spring 41 from pulling the shaft forward into the bore 33. The nut 55 has a forward downwardly sloping conical cam surface 57 but its largest diameter portion is greater than the bore diameter 33 to form a stop. Another conventional nut 59 is screwed onto the threaded shaft portion 53 in rear of the cam nut 55 to lock it in position.

A conventional switch 31 is mounted on the mounting flat surface of one of the wing structures, which switch has a cantilevered arm 61, spring loaded, to normally swing outwardly. The cantilevered arm 61 has a roller wheel 63 on its distal end which will contact the cam surface 57 of the nut 55 on the movable shaft such that as the cam surface 57 is shifted relative to the roller wheel 63 the cantilevered arm 61 swings further outward until it causes a switch to occur between the terminals 64, 65. The switch 31 shown has three terminals but only two 64, 65 are usually used for purposes of the invention. The first two terminals 64, 65 will be electrically connected when the cantilevered arm 61 swings outwardly a distance to place its roller wheel 63 at the bottom of the sloping cam surface 57 as the shaft 43 is moved backward. It should be noted that the cantilevered arm 61 of the switch 31 is off-set from the movable shaft 43 but parallel thereto when the the shaft 43 is in its forward extended position. The switch 31 is held to the mounting surface by bolts 67 which extend completely through the wing structure and are clamped there by nuts 69.

A second and similar switch 29 is mounted on the opposite wing structure 25 so as to provide a mechanical redundancy for electrically indicating the position of the shaft 43. The second switch 29 is indicated by the broken or phantom lines which outline its shape in FIG. 1.

For purposes of illustration, a signal indicating gage 73 is provided as shown in FIG. 1 which may be located in the crew compartment of the space shuttle orbiter. The gage 73 provides a visual light signal from two indicators 75, 76 regarding the shaft 43 position and thus, the load positioning effort. One light signal 75 could be provided, green color for example, to indicate the normal extended position of the shaft, and another signal 76, red color for example, to indicate the shaft 43 in its retracted position which would be when the load is correctly in position. Obviously, the switches 29, 31 may be integrated to provide a single signal or provide a plurality of signals to the gage 73. The additional outside terminal 66 of the switch 31 illustrated could be used for those purposes as it is normally electrically connected with the terminal 65 and disconnects when the cantilevered arm 61 swings outwardly.

The normal extended position of the movable shaft 43 relative to the switch activation arm 61 may be changed by moving the cam nut 55 forward or backward along the threaded position 53 of the shaft 43. When it is considered desirable to have the shaft 43 extend more forward relative to the frontal plate 19, the cam nut 55 may be screwed back along the shaft 43. The coil spring 41 acting on the shaft cap 47 urges the shaft 43 forward, but as previously discussed the cam nut 55 jams against the edge surface about the bore 33. The coil spring 41 is selected to have a length which will provide a strong push on the cap 47 when the shaft 43 is in its most extended position. The shaft 43 with its end cap extends through a hole 49 in the cargo area plate 13, and the shaft 43 and cam nut 55 should be adjusted such that the cap 47 extends beyond the cargo area plate 13 a half of an inch for engagement with the load being positioned.

FIG. 2 shows the indicating device 11 when viewed from a frontal perspective and FIG. 3 shows the same device when viewed from a rear perspective. In FIG. 3 the direction of load application force is shown by line 48.

Figure 4:
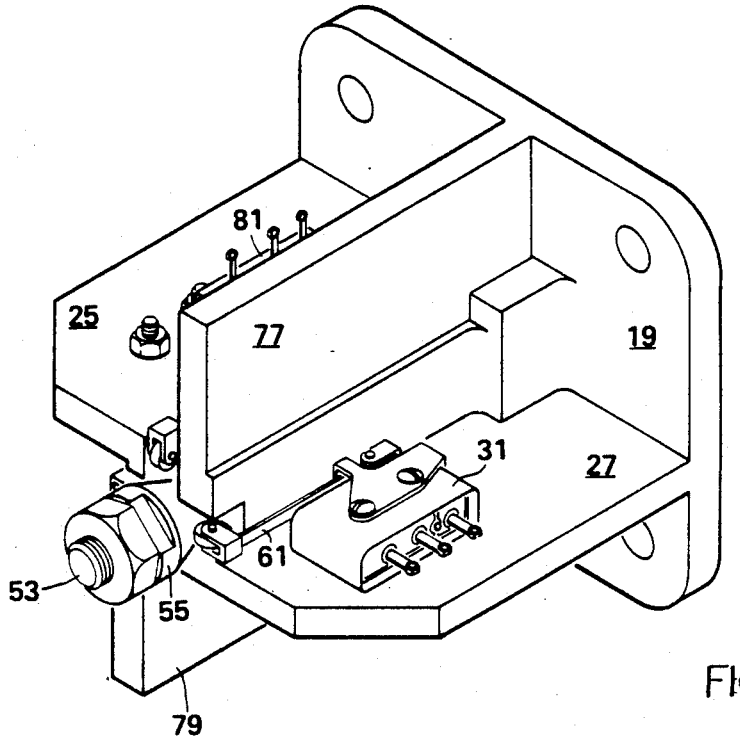
FIG. 4 is a modification of the device which has additional wing structures to support additional electrical switches.

FIG. 4 shows a modification of the indicating device 11 which adds vertical upper and lower wing structures 77, 79 for providing additional mounting surfaces for switches 81 that can also be activated by the cam nut 55. In this manner other positive signals may be given relative to the position of the shaft to other signal devices or additional redundancy may be achieved. The vertical upper and lower wing structures 77, 79 are parallel but horizontally offset similarly to the other two wing structures 25, 27 to obtain the proper mounting location for the switches 81 along the shaft.

It should be noted that the fixed conical rearwardly sloping surface 60 where the shaft 43 is reduced in diameter to form the threaded surface could also be used as another cam surface for activating the switches under desired circumstances. The end slot 62 which accommodates the distal end roller 63 could be extended in length and a switch could be moved and bolted to another location on the wing structure 27 so as to react initially with the movement of the cam surface 60. Thus, the second cam surface 60 could serve as a predetermined location for providing a signal for other purposes.

While the best mode for carrying out the invention has been described, variations and modifications will be readily apparent to those skilled in the art and such changes may be made without departing from the scope of the following claims.

What is claimed is:

1. An indicating device, comprising:

an elongated central housing having a front mounting plate;

said central housing having a hole extending through its length including its front mounting plate;

a movable shaft member with its front end extending forward of said front mounting plate and its rear end extending rearwardly of said central housing;

a spring means for urging said movable shaft forward of said front mounting plate;

a conical cam member adjustably mounted on the rear portion of said movable shaft member to vary the distance said movable shaft extends from said front mounting plate;

said conical cam member having its largest configuration portion larger than the rear opening of said hole within the central housing so as to act as a stop against the housing and thereby prevent said spring means from pulling the rear portion of said movable shaft into said hole;

a first wing structure extending from said housing, said first wing structure having a mounting surface adjacent said central housing; and a first switch means having an activation arm, said first switch means mounted to said mounting surface and having the distal end of its arm adapted to ride against said cam member so as to activate said first switch means when said shaft member is moved from its forward extended position.

2. An indicating device according to claim 1 further comprising:

said movable shaft having a threaded rear portion of reduced diameter than the remaining forward portion;

said conical cam member being threaded onto said threaded rear portion of said movable shaft.

3. An indicating device according to claim 1 further comprising:

a second wing structure angularly related to said first wing structure and extending from said housing; said second wing structure having a mounting surface adjacent said central housing;

a second switch means having an activation arm, said second switch means mounted to the mounting surface of said second wing structure and having the distal end of its arm adapted to ride against said conical cam member so as to activate said second switch means when said shaft member is moved from its forward extended position.

4. An indicating device, comprising:

an elongated central housing having a front mounting plate;

said central housing having a hole extending through its length including its front mounting plate;

a movable shaft member with its front end extending forward of said front mounting plate and its rear end extending rearwardly of said central housing;

a spring means for urging said movable shaft forward of said front mounting plate;

said shaft member having a threaded rear portion of reduced diameter, a cam nut threaded onto said shaft threaded portion and adapted to be adjustably positioned thereon to vary the distance said shaft member extends forward of said front mounting plate;

said cam nut having a forwardly and downwardly sloping conical surface which serves as a cam extending from its largest configuration portion which is larger than the rear opening of said hole within said central housing whereby the largest configuration portion serves as a stop against the housing to prevent said spring means form pulling the rear portion of said movable shaft into said hole;

a plurality of wing structures extending from said housing, each said wing structure having a mounting surface adjacent said central housing;

a plurality of switch means, each switch means mounted on a separate wing structure, and each switch means having an activation arm adapted to be moved by said cam nut when said movable shaft is shifted backward from its extended position.

5. An indicating device according to claim 4 further comprising:

a signal gage electrically connected to each said switch means to provide a visible signal indicating the position of the movable shaft means depending on whether the switch means is electrically closed or opened.

* * * * *